(12) United States Patent
Mims (10) Patent No.: US 7,062,476 B2
(45) Date of Patent: Jun. 13, 2006

(54) STUDENT NEURAL NETWORK

(75) Inventor: A J Mims, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 640 days.

(21) Appl. No.: 10/173,321

(22) Filed: Jun. 17, 2002

(65) Prior Publication Data

US 2003/0233335 A1    Dec. 18, 2003

(51) Int. Cl.
G06N 3/08    (2006.01)

(52) U.S. Cl. .............................. 706/15; 706/16; 706/17; 706/20; 706/25

(58) Field of Classification Search ................... 706/15, 706/25, 26, 31, 32
See application file for complete search history.

(56) References Cited

U.S. PATENT DOCUMENTS

| | | | |
|---|---|---|---|
| 5,701,398 A * | 12/1997 | Glier et al. .................... 706/41 |
| 6,023,422 A | 2/2000 | Allen et al. | |
| 6,125,053 A | 9/2000 | Diorio et al. | |
| 6,144,581 A | 11/2000 | Diorio et al. | |
| 6,172,368 B1 | 1/2001 | Tarr et al. | |
| 6,205,556 B1 | 3/2001 | Watanabe et al. | |
| 6,212,287 B1 | 4/2001 | Olivieri et al. | |
| RE37,259 E | 7/2001 | Ovshinsky | |
| 6,269,351 B1 | 7/2001 | Black | |
| 6,269,352 B1 | 7/2001 | Fabbrizio et al. | |
| 6,269,354 B1 | 7/2001 | Arathorn | |
| 6,317,700 B1 | 11/2001 | Bagne | |
| 6,324,532 B1 | 11/2001 | Spence et al. | |
| 6,336,109 B1 | 1/2002 | Howard | |
| 6,618,713 B1 | 9/2003 | Woodall | |

OTHER PUBLICATIONS

Mace et al., Statistical mechanical analysis of the dynamics of learnng in perceptrons, 1997, Statistics and Computing (1998) 8, 55-88.*
Kwon et al., Generalization in Partially Connected Layered Neural Networks, 1994, ACM 0-89791-655-7/94/0007.*
Nilsson, Artifical Intelligence: A New Synthesis, 1998, Morgran Kaufmann Publishers, pp. 38 and 43.*

* cited by examiner

*Primary Examiner*—Anthony Knight
*Assistant Examiner*—Nathan H. Brown, Jr.
(74) *Attorney, Agent, or Firm*—Harness Dickey & Pierce P.L.C.

(57) ABSTRACT

A student neural network that is capable of receiving a series of tutoring inputs from one or more teacher networks to generate a student network output that is similar to the output of the one or more teacher networks. The tutoring inputs are repeatedly processed by the student until, using a suitable method such as back propagation of errors, the outputs of the student approximate the outputs of the teachers within a predefined range. Once the desired outputs are obtained, the weights of the student network are set. Using this weight set the student is now capable of solving all of the problems of the teacher networks without the need for adjustment of its internal weights. If the user desires to use the student to solve a different series of problems, the user only needs to retrain the student by supplying a different series of tutoring inputs.

18 Claims, 10 Drawing Sheets

| | Input Data $X_1$ $X_2$ | Teacher Output | Teacher Weights X1 X2 J0 J1 J2 | |
|---|---|---|---|---|
| | | | 60 62 64 66 | |
| NULL 28→ | 0 0<br>0 1<br>1 0<br>1 1 | 0<br>0<br>0<br>0 | X1 X2 J0 J1 J2<br>−4.11E+00 −4.09E+00 1.34E+00 0.00E+00 0.00E+00<br>3.29E−05 −1.02E−04 −1.03E−04 −1.35E−04 0.00E+00 | J1<br>A2 |
| AND 30→ | 0 0<br>0 1<br>1 0<br>1 1 | 0<br>0<br>0<br>1 | X1 X2 J0 J1 J2<br>−4.11E+00 −4.09E+00 1.34E+00 0.00E+00 0.00E+00<br>−0.409034 1.009974 1.006433 0.643087 0.00E+00 | J1<br>A2 |
| A~B 32→ | 0 0<br>0 1<br>1 0<br>1 1 | 0<br>0<br>1<br>0 | X1 X2 J0 J1 J2<br>−4.11E+00 −4.09E+00 1.34E+00 0.00E+00 0.00E+00<br>0.410103 −0.013005 −1.010682 −0.647944 0.00E+00 | J1<br>A2 |
| A 34→ | 0 0<br>0 1<br>1 0<br>1 1 | 0<br>0<br>1<br>1 | X1 X2 J0 J1 J2<br>−4.11E+00 −4.09E+00 1.34E+00 0.00E+00 0.00E+00<br>−1.86E−03 1.005866 5.97E−03 7.84E−03 0.00E+00 | J1<br>A2 |
| ~AB 36→ | 0 0<br>0 1<br>1 0<br>1 1 | 0<br>1<br>0<br>0 | X1 X2 J0 J1 J2<br>−4.11E+00 −4.09E+00 1.34E+00 0.00E+00 0.00E+00<br>0.415274 −1.025263 −2.31E−02 −0.662193 0.00E+00 | J1<br>A2 |
| B 38→ | 0 0<br>0 1<br>1 0<br>1 1 | 0<br>1<br>0<br>1 | X1 X2 J0 J1 J2<br>−4.11E+00 −4.09E+00 1.34E+00 0.00E+00 0.00E+00<br>1.49E−03 −4.66E−03 0.9952 −6.21E−03 0.00E+00 | J1<br>A2 |
| XOR 40→ | 0 0<br>0 1<br>1 0<br>1 1 | 0<br>1<br>1<br>0 | X1 X2 J0 J1 J2<br>−4.11E+00 −4.09E+00 1.34E+00 0.00E+00 0.00E+00<br>0.792419 −0.952173 −0.947707 −1.205365 0.00E+00 | J1<br>A2 |
| OR 42→ | 0 0<br>0 1<br>1 0<br>1 1 | 0<br>1<br>1<br>1 | X1 X2 J0 J1 J2<br>−4.11E+00 −4.09E+00 1.34E+00 0.00E+00 0.00E+00<br>0.41931 −3.87E−02 −3.60E−02 −0.68016 0.00E+00 | J1<br>A2 |
| NOR 44→ | 0 0<br>0 1<br>1 0<br>1 1 | 1<br>0<br>0<br>0 | X1 X2 J0 J1 J2<br>−4.11E+00 −4.09E+00 1.34E+00 0.00E+00 0.00E+00<br>0.579114 3.85E−02 3.54E−02 0.677829 0.00E+00 | J1<br>A2 |

FIG. 3A.

| | Input Data (60, 62) | | Teacher Output (64) | Teacher Weights (66) | | | | | |
|---|---|---|---|---|---|---|---|---|---|
| | $X_1$ | $X_2$ | | X1 | X2 | J0 | J1 | J2 | |
| XNOR  46→ | 0 | 0 | 1 | −4.11E+00 | −4.09E+00 | 1.34E+00 | 0.00E+00 | 0.00E+00 | J1 |
| | 0 | 1 | 0 | 0.198143 | 0.97576 | 0.969951 | 1.233178 | 0.00E+00 | A2 |
| | 1 | 0 | 0 | | | | | | |
| | 1 | 1 | 1 | X1 | X2 | J0 | J1 | J2 | |
| ~B  48→ | 0 | 0 | 1 | −4.11E+00 | −4.09E+00 | 1.34E+00 | 0.00E+00 | 0.00E+00 | J1 |
| | 0 | 1 | 0 | 0.995833 | 1.20E−02 | −0.988005 | 1.54E−02 | 0.00E+00 | A2 |
| | 1 | 0 | 1 | | | | | | |
| | 1 | 1 | 0 | X1 | X2 | J0 | J1 | J2 | |
| ~A+B  50→ | 0 | 0 | 1 | −4.11E+00 | −4.09E+00 | 1.34E+00 | 0.00E+00 | 0.00E+00 | J1 |
| | 0 | 1 | 0 | 0.58344 | 1.034956 | 3.12E−02 | 0.676731 | 0.00E+00 | A2 |
| | 1 | 0 | 1 | | | | | | |
| | 1 | 1 | 1 | X1 | X2 | J0 | J1 | J2 | |
| ~A  52→ | 0 | 0 | 1 | −4.11E+00 | −4.09E+00 | 1.34E+00 | 0.00E+00 | 0.00E+00 | J1 |
| | 0 | 1 | 1 | 1.00831 | −1.003169 | −3.15E−03 | −4.30E−03 | 0.00E+00 | A2 |
| | 1 | 0 | 0 | | | | | | |
| | 1 | 1 | 0 | X1 | X2 | J0 | J1 | J2 | |
| A~B  54→ | 0 | 0 | 1 | −4.11E+00 | −4.09E+00 | 1.34E+00 | 0.00E+00 | 0.00E+00 | J1 |
| | 0 | 1 | 1 | 0.581886 | 3.33E−02 | 1.02962 | 0.672426 | 0.00E+00 | A2 |
| | 1 | 0 | 0 | | | | | | |
| | 1 | 1 | 1 | X1 | X2 | J0 | J1 | J2 | |
| NAND  56→ | 0 | 0 | 1 | −4.11E+00 | −4.09E+00 | 1.34E+00 | 0.00E+00 | 0.00E+00 | J1 |
| | 0 | 1 | 1 | 1.405987 | −0.999026 | −0.993308 | −0.626614 | 0.00E+00 | A2 |
| | 1 | 0 | 1 | | | | | | |
| | 1 | 1 | 0 | X1 | X2 | J0 | J1 | J2 | |
| ONE  58→ | 0 | 0 | 1 | −4.11E+00 | −4.09E+00 | 1.34E+00 | 0.00E+00 | 0.00E+00 | J1 |
| | 0 | 1 | 1 | 1.000354 | −1.20E−03 | −1.17E−03 | −1.59E−03 | 0.00E+00 | A2 |
| | 1 | 0 | 1 | | | | | | |
| | 1 | 1 | 1 | | | | | | |

FIG. 3B.

|  | 60 | 62 |  | 66 |  |  | 64 |
|---|---|---|---|---|---|---|---|
|  |  | X1 X2 | A<2,1> | A<2,2> | J<2,0> | J<2,1> | A2 |
| 28 → | NULL | 0 0 | 3.29E−05 | −0.000102 | −0.000103 | −0.000135 | 0 |
|  |  | 0 1 | 3.29E−05 | −0.000102 | −0.000103 | −0.000135 | 0 |
|  |  | 1 0 | 3.29E−05 | −0.000102 | −0.000103 | −0.000135 | 0 |
|  |  | 1 1 | 3.29E−05 | −0.000102 | −0.000103 | −0.000135 | 0 |
| 30 → | AND | 0 0 | −0.409034 | 1.009974 | 1.006433 | 0.643087 | 0 |
|  |  | 0 1 | −0.409034 | 1.009974 | 1.006433 | 0.643087 | 0 |
|  |  | 1 0 | −0.409034 | 1.009974 | 1.006433 | 0.643087 | 0 |
|  |  | 1 1 | −0.409034 | 1.009974 | 1.006433 | 0.643087 | 1 |
| 32 → | A~B | 0 0 | 0.410103 | −0.013005 | −1.010682 | −0.647944 | 0 |
|  |  | 0 1 | 0.410103 | −0.013005 | −1.010682 | −0.647944 | 0 |
|  |  | 1 0 | 0.410103 | −0.013005 | −1.010682 | −0.647944 | 1 |
|  |  | 1 1 | 0.410103 | −0.013005 | −1.010682 | −0.647944 | 0 |
| 34 → | A | 0 0 | −0.001863 | 1.005866 | 0.005969 | 0.007842 | 0 |
|  |  | 0 1 | −0.001863 | 1.005866 | 0.005969 | 0.007842 | 0 |
|  |  | 1 0 | −0.001863 | 1.005866 | 0.005969 | 0.007842 | 1 |
|  |  | 1 1 | −0.001863 | 1.005866 | 0.005969 | 0.007842 | 1 |
| 36 → | ~AB | 0 0 | 0.415274 | −1.025263 | −0.02305 | −0.662193 | 0 |
|  |  | 0 1 | 0.415274 | −1.025263 | −0.02305 | −0.662193 | 1 |
|  |  | 1 0 | 0.415274 | −1.025263 | −0.02305 | −0.662193 | 0 |
|  |  | 1 1 | 0.415274 | −1.025263 | −0.02305 | −0.662193 | 0 |
| 38 → | B | 0 0 | 0.001486 | −0.004655 | 0.9952 | −0.006205 | 0 |
|  |  | 0 1 | 0.001486 | −0.004655 | 0.9952 | −0.006205 | 1 |
|  |  | 1 0 | 0.001486 | −0.004655 | 0.9952 | −0.006205 | 0 |
|  |  | 1 1 | 0.001486 | −0.004655 | 0.9952 | −0.006205 | 1 |
| 40 → | XOR | 0 0 | 0.792419 | −0.952173 | −0.947707 | −1.205365 | 0 |
|  |  | 0 1 | 0.792419 | −0.952173 | −0.947707 | −1.205365 | 1 |
|  |  | 1 0 | 0.792419 | −0.952173 | −0.947707 | −1.205365 | 1 |
|  |  | 1 1 | 0.792419 | −0.952173 | −0.947707 | −1.205365 | 0 |
| 42 → | OR | 0 0 | 0.41931 | −0.038694 | −0.035962 | −0.68016 | 0 |
|  |  | 0 1 | 0.41931 | −0.038694 | −0.035962 | −0.68016 | 1 |
|  |  | 1 0 | 0.41931 | −0.038694 | −0.035962 | −0.68016 | 1 |
|  |  | 1 1 | 0.41931 | −0.038694 | −0.035962 | −0.68016 | 1 |
| 44 → | NOR | 0 0 | 0.579114 | 0.038506 | 0.035399 | 0.677829 | 1 |
|  |  | 0 1 | 0.579114 | 0.038506 | 0.035399 | 0.677829 | 0 |
|  |  | 1 0 | 0.579114 | 0.038506 | 0.035399 | 0.677829 | 0 |
|  |  | 1 1 | 0.579114 | 0.038506 | 0.035399 | 0.677829 | 0 |

FIG. 5A.

|  | | 60 | 62 | | 66 | | | 64 |
|---|---|---|---|---|---|---|---|---|
|  | | | X1 | X2 | A<2,1> | A<2,2> | J<2,0> | J<2,1> | A2 |
| 46 → | XNOR | 0 | 0 | 0.198143 | 0.97576 | 0.969951 | 1.233178 | 1 |
|  |  | 0 | 1 | 0.198143 | 0.97576 | 0.969951 | 1.233178 | 0 |
|  |  | 1 | 0 | 0.198143 | 0.97576 | 0.969951 | 1.233178 | 0 |
|  |  | 1 | 1 | 0.198143 | 0.97576 | 0.969951 | 1.233178 | 1 |
| 48 → | ~B | 0 | 0 | 0.995833 | 0.011989 | −0.988005 | 0.015392 | 1 |
|  |  | 0 | 1 | 0.995833 | 0.011989 | −0.988005 | 0.015392 | 0 |
|  |  | 1 | 0 | 0.995833 | 0.011989 | −0.988005 | 0.015392 | 1 |
|  |  | 1 | 1 | 0.995833 | 0.011989 | −0.988005 | 0.015392 | 0 |
| 50 → | ~A+B | 0 | 0 | 0.58344 | 1.034956 | 0.031229 | 0.676731 | 1 |
|  |  | 0 | 1 | 0.58344 | 1.034956 | 0.031229 | 0.676731 | 0 |
|  |  | 1 | 0 | 0.58344 | 1.034956 | 0.031229 | 0.676731 | 1 |
|  |  | 1 | 1 | 0.58344 | 1.034956 | 0.031229 | 0.676731 | 1 |
| 52 → | ~A | 0 | 0 | 1.000831 | −1.003169 | −0.003148 | −0.004297 | 1 |
|  |  | 0 | 1 | 1.000831 | −1.003169 | −0.003148 | −0.004297 | 1 |
|  |  | 1 | 0 | 1.000831 | −1.003169 | −0.003148 | −0.004297 | 0 |
|  |  | 1 | 1 | 1.000831 | −1.003169 | −0.003148 | −0.004297 | 0 |
| 54 → | A~B | 0 | 0 | 0.581886 | 0.033347 | 1.02962 | 0.672425 | 1 |
|  |  | 0 | 1 | 0.581886 | 0.033347 | 1.02962 | 0.672425 | 1 |
|  |  | 1 | 0 | 0.581886 | 0.033347 | 1.02962 | 0.672425 | 0 |
|  |  | 1 | 1 | 0.581886 | 0.033347 | 1.02962 | 0.672425 | 1 |
| 56 → | NAND | 0 | 0 | 1.405987 | −0.999026 | −0.993308 | −0.626614 | 1 |
|  |  | 0 | 1 | 1.405987 | −0.999026 | −0.993308 | −0.626614 | 1 |
|  |  | 1 | 0 | 1.405987 | −0.999026 | −0.993308 | −0.626614 | 1 |
|  |  | 1 | 1 | 1.405987 | −0.999026 | −0.993308 | −0.626614 | 0 |
| 58 → | ONE | 0 | 0 | 1.000354 | −0.001198 | −0.001174 | −0.001588 | 1 |
|  |  | 0 | 1 | 1.000354 | −0.001198 | −0.001174 | −0.001588 | 1 |
|  |  | 1 | 0 | 1.000354 | −0.001198 | −0.001174 | −0.001588 | 1 |
|  |  | 1 | 1 | 1.000354 | −0.001198 | −0.001174 | −0.001588 | 1 |

FIG. 5B.

|  | | X1 | X2 | A<2,1> | A<2,2> | J<2,0> | J<2,1> | A2 | A4 |
|---|---|---|---|---|---|---|---|---|---|
| 28 → | NULL | 0 | 0 | 3.29E−05 | −0.000102 | −0.000103 | −0.000135 | 0 | 0.073 |
|  |  | 0 | 1 | 3.29E−05 | −0.000102 | −0.000103 | −0.000135 | 0 | 0.009 |
|  |  | 1 | 0 | 3.29E−05 | −0.000102 | −0.000103 | −0.000135 | 0 | 0.013 |
|  |  | 1 | 1 | 3.29E−05 | −0.000102 | −0.000103 | −0.000135 | 0 | 0.051 |
| 30 → | AND | 0 | 0 | −0.409034 | 1.009974 | 1.006433 | 0.643087 | 0 | 0.061 |
|  |  | 0 | 1 | −0.409034 | 1.009974 | 1.006433 | 0.643087 | 0 | −0.033 |
|  |  | 1 | 0 | −0.409034 | 1.009974 | 1.006433 | 0.643087 | 0 | −0.001 |
|  |  | 1 | 1 | −0.409034 | 1.009974 | 1.006433 | 0.643087 | 1 | 0.978 |
| 32 → | A~B | 0 | 0 | 0.410103 | −0.013005 | −1.010682 | −0.647944 | 0 | −0.069 |
|  |  | 0 | 1 | 0.410103 | −0.013005 | −1.010682 | −0.647944 | 0 | 0.015 |
|  |  | 1 | 0 | 0.410103 | −0.013005 | −1.010682 | −0.647944 | 1 | 1.017 |
|  |  | 1 | 1 | 0.410103 | −0.013005 | −1.010682 | −0.647944 | 0 | 0.009 |
| 34 → | A | 0 | 0 | −0.001863 | 1.005866 | 0.005969 | 0.007842 | 0 | −0.093 |
|  |  | 0 | 1 | −0.001863 | 1.005866 | 0.005969 | 0.007842 | 0 | −0.052 |
|  |  | 1 | 0 | −0.001863 | 1.005866 | 0.005969 | 0.007842 | 1 | 1.033 |
|  |  | 1 | 1 | −0.001863 | 1.005866 | 0.005969 | 0.007842 | 1 | 1.022 |
| 36 → | ~AB | 0 | 0 | 0.415274 | −1.025263 | −0.02305 | −0.662193 | 0 | 0.019 |
|  |  | 0 | 1 | 0.415274 | −1.025263 | −0.02305 | −0.662193 | 1 | 0.960 |
|  |  | 1 | 0 | 0.415274 | −1.025263 | −0.02305 | −0.662193 | 0 | 0.083 |
|  |  | 1 | 1 | 0.415274 | −1.025263 | −0.02305 | −0.662193 | 0 | 0.050 |
| 38 → | B | 0 | 0 | 0.001486 | −0.004655 | 0.9952 | −0.006205 | 0 | 0.006 |
|  |  | 0 | 1 | 0.001486 | −0.004655 | 0.9952 | −0.006205 | 1 | 0.953 |
|  |  | 1 | 0 | 0.001486 | −0.004655 | 0.9952 | −0.006205 | 0 | −0.087 |
|  |  | 1 | 1 | 0.001486 | −0.004655 | 0.9952 | −0.006205 | 1 | 1.016 |
| 40 → | XOR | 0 | 0 | 0.792419 | −0.952173 | −0.947707 | −1.205365 | 0 | 0.055 |
|  |  | 0 | 1 | 0.792419 | −0.952173 | −0.947707 | −1.205365 | 1 | 0.912 |
|  |  | 1 | 0 | 0.792419 | −0.952173 | −0.947707 | −1.205365 | 1 | 0.984 |
|  |  | 1 | 1 | 0.792419 | −0.952173 | −0.947707 | −1.205365 | 0 | 0.048 |
| 42 → | OR | 0 | 0 | 0.41931 | −0.038694 | −0.035962 | −0.68016 | 0 | 0.009 |
|  |  | 0 | 1 | 0.41931 | −0.038694 | −0.035962 | −0.68016 | 1 | 0.933 |
|  |  | 1 | 0 | 0.41931 | −0.038694 | −0.035962 | −0.68016 | 1 | 1.021 |
|  |  | 1 | 1 | 0.41931 | −0.038694 | −0.035962 | −0.68016 | 1 | 1.037 |
| 44 → | NOR | 0 | 0 | 0.579114 | 0.038506 | 0.035399 | 0.677829 | 1 | 0.938 |
|  |  | 0 | 1 | 0.579114 | 0.038506 | 0.035399 | 0.677829 | 0 | −0.054 |
|  |  | 1 | 0 | 0.579114 | 0.038506 | 0.035399 | 0.677829 | 0 | −0.099 |
|  |  | 1 | 1 | 0.579114 | 0.038506 | 0.035399 | 0.677829 | 0 | 0.020 |

Columns 60, 62, 66, 64, 80

FIG. 5A.

|   | 60 | 62 | 66 | | | | 64 | 80 |
|---|---|---|---|---|---|---|---|---|
|   |   | X1 X2 | A<2,1> | A<2,2> | J<2,0> | J<2,1> | A2 | A4 |
| 46 → | XNOR | 0 0<br>0 1<br>1 0<br>1 1 | 0.198143<br>0.198143<br>0.198143<br>0.198143 | 0.97576<br>0.97576<br>0.97576<br>0.97576 | 0.969951<br>0.969951<br>0.969951<br>0.969951 | 1.233178<br>1.233178<br>1.233178<br>1.233178 | 1<br>0<br>0<br>1 | 1.004<br>−0.053<br>0.036<br>0.915 |
| 48 → | ~B | 0 0<br>0 1<br>1 0<br>1 1 | 0.995833<br>0.995833<br>0.995833<br>0.995833 | 0.011989<br>0.011989<br>0.011989<br>0.011989 | −0.988005<br>−0.988005<br>−0.988005<br>−0.988005 | 0.015392<br>0.015392<br>0.015392<br>0.015392 | 1<br>0<br>1<br>0 | 0.993<br>−0.032<br>0.980<br>−0.025 |
| 50 → | ~A+B | 0 0<br>0 1<br>1 0<br>1 1 | 0.58344<br>0.58344<br>0.58344<br>0.58344 | 1.034956<br>1.034956<br>1.034956<br>1.034956 | 0.031229<br>0.031229<br>0.031229<br>0.031229 | 0.676731<br>0.676731<br>0.676731<br>0.676731 | 1<br>0<br>1<br>1 | 1.010<br>−0.092<br>0.974<br>0.986 |
| 52 → | ~A | 0 0<br>0 1<br>1 0<br>1 1 | 1.000831<br>1.000831<br>1.000831<br>1.000831 | −1.003169<br>−1.003169<br>−1.003169<br>−1.003169 | −0.003148<br>−0.003148<br>−0.003148<br>−0.003148 | −0.004297<br>−0.004297<br>−0.004297<br>−0.004297 | 1<br>1<br>0<br>0 | 0.914<br>1.026<br>0.012<br>0.014 |
| 54 → | A~B | 0 0<br>0 1<br>1 0<br>1 1 | 0.581886<br>0.581886<br>0.581886<br>0.581886 | 0.033347<br>0.033347<br>0.033347<br>0.033347 | 1.02962<br>1.02962<br>1.02962<br>1.02962 | 0.672425<br>0.672425<br>0.672425<br>0.672425 | 1<br>1<br>0<br>1 | 1.025<br>1.001<br>0.062<br>0.973 |
| 56 → | NAND | 0 0<br>0 1<br>1 0<br>1 1 | 1.405987<br>1.405987<br>1.405987<br>1.405987 | −0.999026<br>−0.999026<br>−0.999026<br>−0.999026 | −0.993308<br>−0.993308<br>−0.993308<br>−0.993308 | −0.626614<br>−0.626614<br>−0.626614<br>−0.626614 | 1<br>1<br>1<br>0 | 1.091<br>1.013<br>1.025<br>−0.021 |
| 58 → | ONE | 0 0<br>0 1<br>1 0<br>1 1 | 1.000354<br>1.000354<br>1.000354<br>1.000354 | −0.001198<br>−0.001198<br>−0.001198<br>−0.001198 | −0.001174<br>−0.001174<br>−0.001174<br>−0.001174 | −0.001588<br>−0.001588<br>−0.001588<br>−0.001588 | 1<br>1<br>1<br>1 | 1.047<br>1.031<br>1.055<br>1.010 |

| | | Process Inputs | | Inputs From Teacher Nets Weightsets | | | | Hidden Nodes | | | Output Node |
|---|---|---|---|---|---|---|---|---|---|---|---|
| | | X1 | X2 | A<2,1> | A<2,2> | J<2,0> | J<2,1> | J0 | J1 | J2 | J3 | A4 |
| Hidden Nodes | J1 | -5.414 | -0.253 | -0.071 | 1.221 | -0.014 | 0.074 | 0.199 | 0 | 0 | 0 | 0 |
| | J2 | -5.532 | -5.002 | 0.006 | 1.338 | 2.043 | -3.539 | 0.015 | -1.916 | 0 | 0 | 0 |
| | J3 | -0.967 | -4.891 | -0.116 | -0.068 | 1.536 | 0.233 | -3.833 | -3.742 | -1.244 | 0 | 0 |
| Output | A4 | -1.8 | -1.561 | 0.955 | 1.004 | 1.059 | -0.968 | -1.296 | -1.916 | -1.344 | -1.491 | 0 |

FIG. 8A.

| Process Inputs | | Inputs From Teacher Nets Weightsets | | | | Hidden Nodes | | | | Student Outputs | Teacher Outputs |
|---|---|---|---|---|---|---|---|---|---|---|---|
| X1 | X2 | A<2,1> | A<2,2> | J<2,0> | J<2,1> | J0 | J1 | J2 | J3 | A4 | |
| ONE | | | | | | | | | | | |
| 0 | 0 | 1.000354 | -0.001198 | -0.001174 | -0.001588 | 1 | 0.063121 | -0.049121 | -0.968226 | 1.047131 | 1.0 |
| 0 | 1 | 1.000354 | -0.001198 | -0.001174 | -0.001588 | 1 | -0.06321 | -0.984592 | -0.998755 | 1.030974 | 1.0 |
| 1 | 0 | 1.000354 | -0.001198 | -0.001174 | -0.001588 | 1 | -0.989943 | -0.947457 | -0.017563 | 1.054729 | 1.0 |
| 1 | 1 | 1.000354 | -0.001198 | -0.001174 | -0.001588 | 1 | -0.992182 | -0.999636 | -0.984509 | 1.009863 | 1.0 |

STUDENT NEURAL NETWORK

FIELD OF THE INVENTION

The present invention generally relates to the use of a neural network to process information. More specifically, the present invention relates to the use of information generated in the training of a first neural network as inputs to train a second neural network.

BACKGROUND OF THE INVENTION

A neural network is a network of many very simple processors, the processors also being known as neurons, nodes, units, or perceptrons. The processors are connected by unidirectional communication channels (connections), that carry numeric data. The processors operate only on their local data and on the inputs they receive by way of the connections. Numerical values called weights express the strength of each connection. The weights may be modified to increase or decrease the strength of the connections.

While there are many different types of neural networks, feed-forward neural networks are the most common. Feed-forward neural networks can generally be implemented as functions y(f,w) of a vector "f" of inputs and a weight or parameter vector "w". Adjustment of vector w is referred to as training. Thus, instead of being pre-programmed to carry out a specific task, feed-forward neural networks have a "training" rule whereby the internal weights of each connection are adjusted according to data patterns introduced to each weight. While numerous different training methods are currently available, one of the most commonly used methods is error back-propagation.

Training of the internal weights or gains is difficult, especially when the neural network is implemented in hardware such as an analog computation device or chip. Many schemes have been developed to aid the insertion of the weights or gains into the proper location of the mathematical process. However, most of these approaches involve charge injection into floating gate devices to adjust the internal impedances or select internal voltages, thus presenting numerous well known difficulties. Some of the difficulties presented are lack of precision of the charge injection, verification of the charge injected, and leakage of the charge injected resulting in drifting of the weights. As a result, there is a need for a neural network that may be easily trained without the need to adjust the network's internal weights or gains.

Neural network training is also difficult because training data sets generally contain a vast quantity of information even though only a small fraction of the information is relevant to carry out the desired task. Processing such a large amount of information requires a great amount of time and requires expending a large amount of computing power. As the task to be carried out by a particular neural network increases, the time and computing power expended to perform the task also increases, eventually reaching the point where any advantages associated with using a neural network to perform the task are lost.

In order to more efficiently process complex information using neural networks, attempts have been made to reuse the results of previous training efforts and computer time so that similar classes of complex problems can be solved without re-teaching a random network from scratch (tabula rasa). Currently, this is done by either training unique networks for each similar task or by training one network "A" to complete one of the tasks and then retraining the resulting network to perform a similar task as network "B". However, these methods have not proven to be desirable as the retraining of network "A" often takes more time than the training of an empty, random, untrained network. Further, there is no guarantee that A's training is of any use to the training of B as any similarity of tasks may only be in the eye of the user. Finally, the retraining of prior networks may disturb or destroy the arrangement of weights and cause the network to not be useful for its desired task.

Consequently, to make the use of a neural network viable for processing complex operations, a need exists to be able to reduce the amount of training that must be done in order to carry out each operation. More specifically, there exists a need to reuse the results of previous training efforts and computer time so that similar classes of problems can be solved without re-teaching a random network from scratch. Further, there is a need to carryout this training without adjusting the internal weights or gains of the network.

SUMMARY OF THE INVENTION

The present invention overcomes the deficiencies of the prior art by providing a student neural network. The student network is capable of receiving a series of tutoring inputs from one or more teacher networks. The tutoring inputs are introduced externally to the student by way of a suitable conducting device such as metal pins. The tutoring inputs are repeatedly processed by the student until, using a suitable method such as back propagation of errors, the outputs of the student approximate the outputs of the teachers within a predefined error range.

Once the desired outputs are obtained, the weights of the student network are set. Using this new weight set the student is now capable of solving all of the problems of the teacher networks without the need for adjustment of its internal weights. Further, if the user desires to use the student to solve a different series of problems, the user only needs to "retrain" the student by supplying a different series of tutoring inputs. Thus, in order to "retrain" the student direct access to the weights of the student is not necessary.

BRIEF DESCRIPTION OF THE DRAWINGS

The present invention will become more fully understood from the detailed description and the accompanying drawings, wherein:

FIG. 3b is a continuation of table 3a.

FIG. 5b is a continuation of FIG. 5a.

FIG. 6a is a table illustrating the tutoring inputs that are repeatedly run through the student until the student produces outputs that are within a pre-selected range of error when compared to the outputs of each teacher network;

FIG. 6b is a continuation of FIG. 6a.

DETAILED DESCRIPTION OF THE PREFERRED EMBODIMENTS

The following description of the preferred embodiment(s) is merely exemplary in nature and is in no way intended to limit the invention, its application, or uses.

Figure 1:
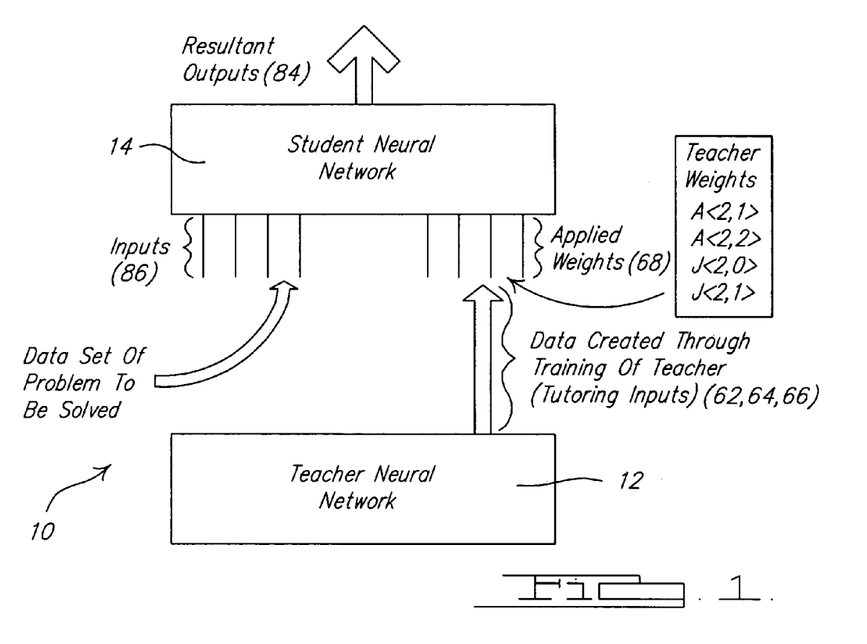
FIG. 1 is a system block diagram showing the general components of the invention, the invention providing a student neural network that is trained by one or more teacher neural networks to solve all of the problems that the teacher networks are capable of solving.

A neural network system 10 according to a preferred embodiment of the present invention is illustrated in FIG. 1. Neural network system 10 generally includes at least one teacher neural network 12 and a student neural network 14. The neural networks 12, 14 may be of any suitable type of neural network but, for exemplary purposes, will be described as feed-forward neural networks. Teacher network 12 is trained to process information to solve a particular problem using any suitable conventional training method. The information created as a result of training teacher network 12 is conserved within the network 12 and used as "tutoring inputs" to the student network 14. Using the tutoring inputs from teacher network 12, the student network 14 learns the method of producing results approaching the results of the teacher network 12 over a class of datasets of similar problems. After the student 14 has learned to solve the problems of one or more teacher networks 12, no future training or adjustment of student network 14 is required.

Figure 2:
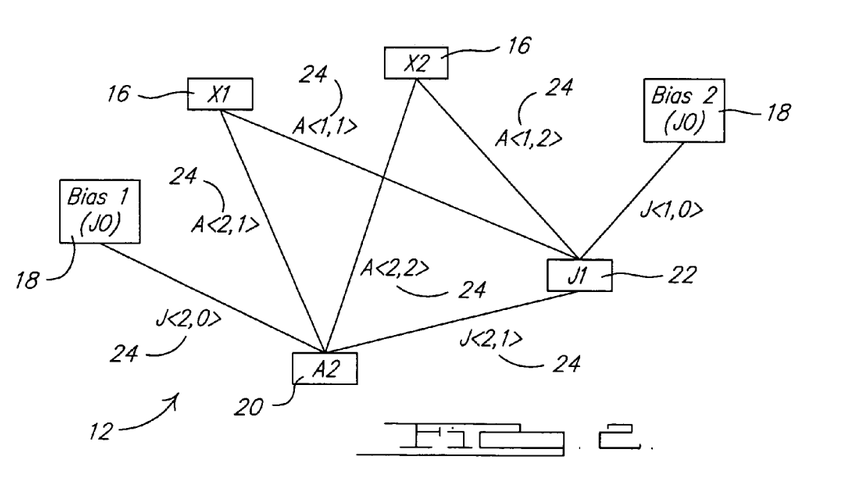
FIG. 2 is a diagram showing the configuration and interconnection of the nodes of the teacher network.

The teacher neural network 12 will now be described in detail. As seen in FIG. 2, teacher neural network 12 includes four input nodes. The input nodes consist of two process inputs 16, X1 and X2, and two bias inputs 18, J0. Each process input 16 may be in the form of a variety of different inputs but will be described as either a logic one or a logic zero. Consequently, there are four different possible combinations of process inputs 16, the four possible combinations being the following: 0,0; 1,0; 0,1, 1,1. In contrast, both bias inputs 18 are preferably set at 1.

Each input node 16, 18 is connected to an output node A2 20. The inputs 16, 18 may be either directly connected to output 20 or by way of hidden node J1 at 22. Hidden node 22 is a summation point at which the value of the inputs 16, 18 are summed before they are sent to output node 20.

The connection strength between input nodes 16, 18, output node 20, and hidden node 22 is expressed by weights 24. As illustrated in FIG. 2, the weights 24 between each node 16, 18, 20, and 22 are represented using an annotation in the form of a letter followed by two numbers. The letter "A" represents the output node 20 and the letter "J" represents the hidden node 22. The first number following either letter represents the destination node and the second letter represents the originating node. For example, input node X1 16 is connected to output node A2 20 by weight A<2,1> 24. The value of each weight 24 differs according to the particular problem to be solved. The exact setting of weights 24 for each problem may be determined using any suitable method or process such as back propagation of errors.

The connection strength between input nodes 16, 18, and either hidden node 22 or output node 20 is determined by multiplying each value input to nodes 16, 18 by each corresponding weight 24 connecting inputs 16, 18 to either hidden node 22 or output node 20. The resulting products are then summed at the hidden node 22 and at the output node 20. Specifically, the value of hidden node 22 is determined using the following equation:

$$A<1,1>*X1+A<1,2>*X2+J<1,0>*J0.$$

Further, the value of the output 20 is determined using the following equation:

$$J<2,0>*J0+A<2,1>*X1+A<2,2>*X2+\tan h(0.5(J1)).$$

While the above described teacher network 12 consists of four input nodes 16, 18 and one hidden node 22 connected to an output 20, Applicant's invention is not limited to such a configuration. Specifically, the teacher network 12 of Applicant's invention may consist of any suitable neural network having any number of input nodes, output nodes, and hidden nodes interconnected in any suitable configuration.

Figure 3A:
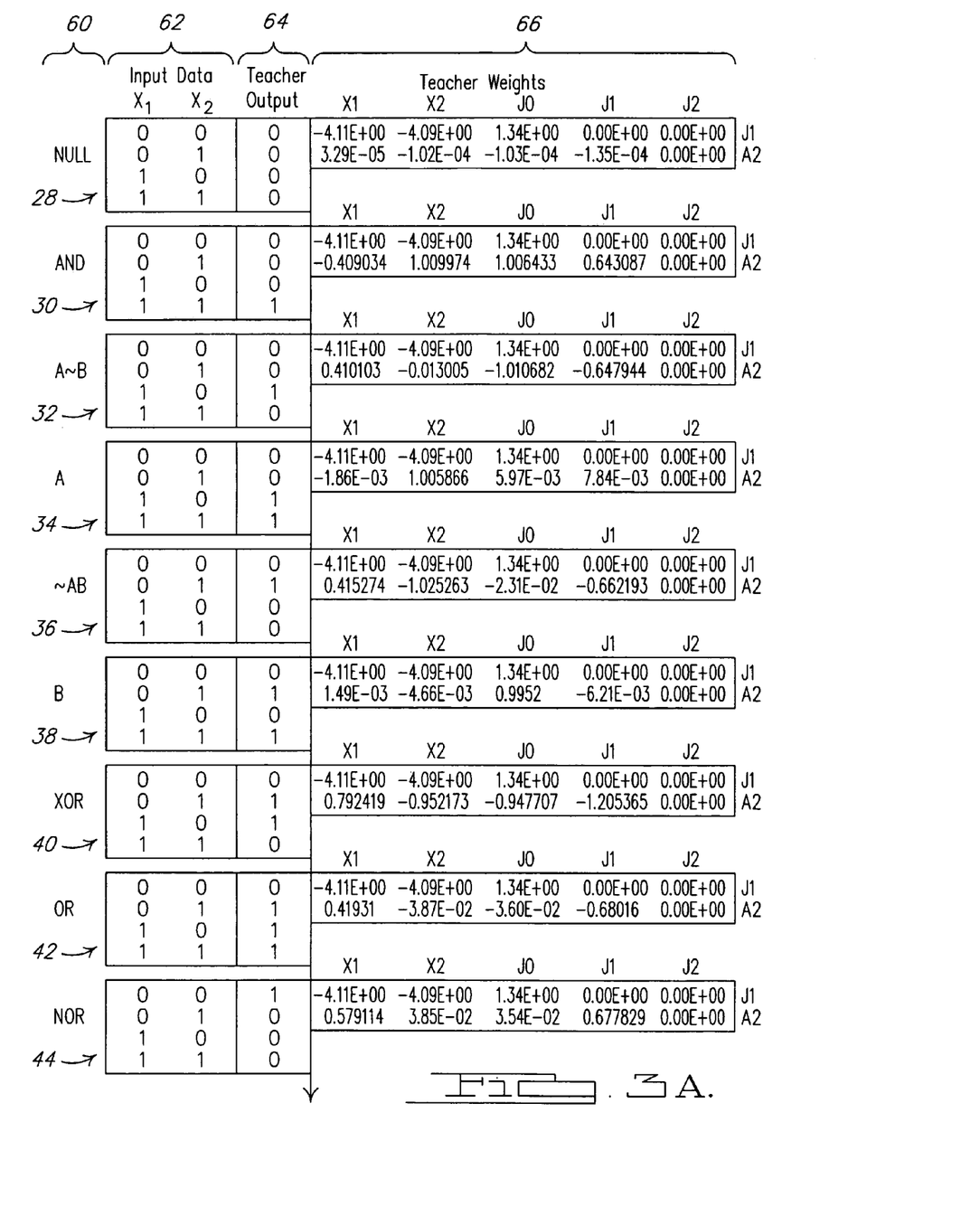
FIG. 3a is a table illustrating the problem set input data, teacher output, and teacher weight settings of numerous different teacher networks, the weights of each teacher network set so as to solve a different Boolean function.
Figure 3B:
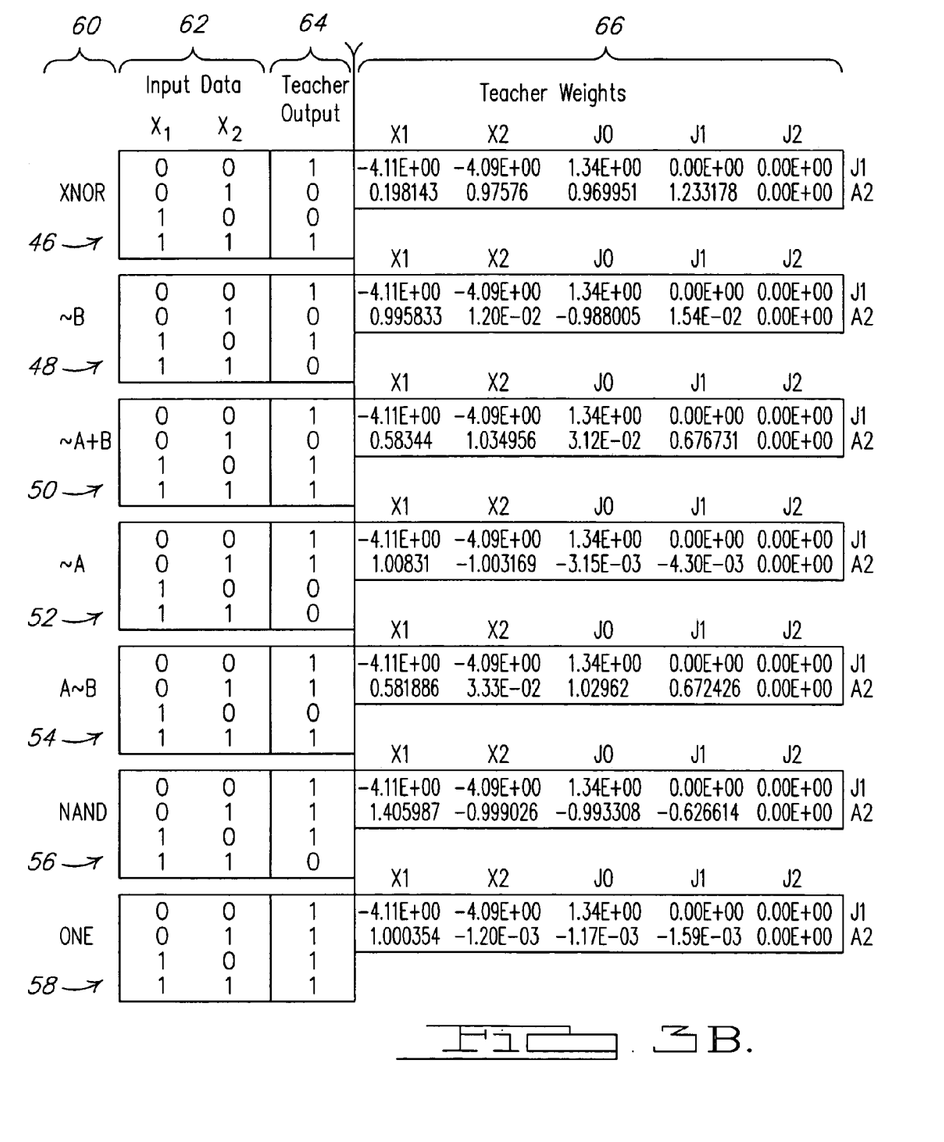

The above described teacher neural network 12 may be used to solve a wide variety of different equations, such as Boolean functions. As seen in FIGS. 3a and 3b, sixteen different teacher neural networks 28 through 58 may each be used to solve one of sixteen different Boolean functions 60. Specifically, FIG. 3 provides the function 60 to be solved, the different possible problem sets or inputs 62 to input nodes 16, the teacher network solution outputs 64, and the settings of weights 24 required to obtain the outputs 64 at table 66. It will be appreciated that the weights shown are merely for illustrative purposes and are simply examples of weights that may be used to solve the particular function. The weight value 24 connecting each node is read by cross referencing the nodes of each weight set 66. For example, in order to obtain the desired output 64 from network 28 when solving the Boolean function NULL, the following weight set 66 must be used:

| WEIGHT | VALUE |
| --- | --- |
| A<1,1> | −4.11 |
| A<1,2> | −4.09 |
| J<1,0> | 1.34 |
| A<2,1> | 3.29E−05 |
| A<2,2> | −1.02E−04 |
| J<2,0> | −1.03E−04 |
| J<2,1> | −1.35E−04 |

The particular Boolean function that each network 28 through 58 is capable of solving depends upon the settings of weights 24. As seen in FIG. 3 at 66 the weights 24 of network 28 are set to solve the function NULL, network 30 is set to solve AND, network 32 solves A~B, network 34 solves A, network 36 solves ~AB, network 38 solves B, network 40 solves XOR, network 42 solves OR, network 44 solves NOR, network 46 solves XNOR, network 48 solves ~B, network 50 solves ~A+B, network 52 solves ~A, network 54 solves A~B, network 56 solves NAND, and network 58 solves ONE.

The method of setting weights 24 will now be described. As seen in FIG. 3, all four possible inputs 62 are entered into each network 28 through 58 via inputs 16 so as to produce a total of sixty-four teacher outputs 64, four outputs for each Boolean function. Using the input data 62, networks 28 through 58 are repeatedly run until, using a suitable method such as back propagation of errors, the desired outputs 64 are obtained within a pre-set margin of error. Once the desired outputs 64 are achieved, the weights 24 used to obtain the desired outputs 64 are fixed, the fixed weight sets being displayed in FIG. 3 at 66. Thus, each network 28 through 58 may be repeatedly used to obtain the desired output 64 in response to each particular input data set 62.

After the weights 24 of each of the teacher networks 28 through 58 have been set to obtain the desired outputs 64 within the margin of error set by the user, the sixty-four different input data sets 62, the outputs 64 associated with each data set 62, and the weight set 66 used to obtain each output 64 are used as "tutoring inputs" to the student network 14. As seen in FIG. 1, the tutoring inputs may be applied to student network 14 by way of any suitable conducting device external to the student network 14, such as metal pins 68. The use of an external conducting device eliminates the need to adjust the internal weights 24 of the student 14.

Figure 4:
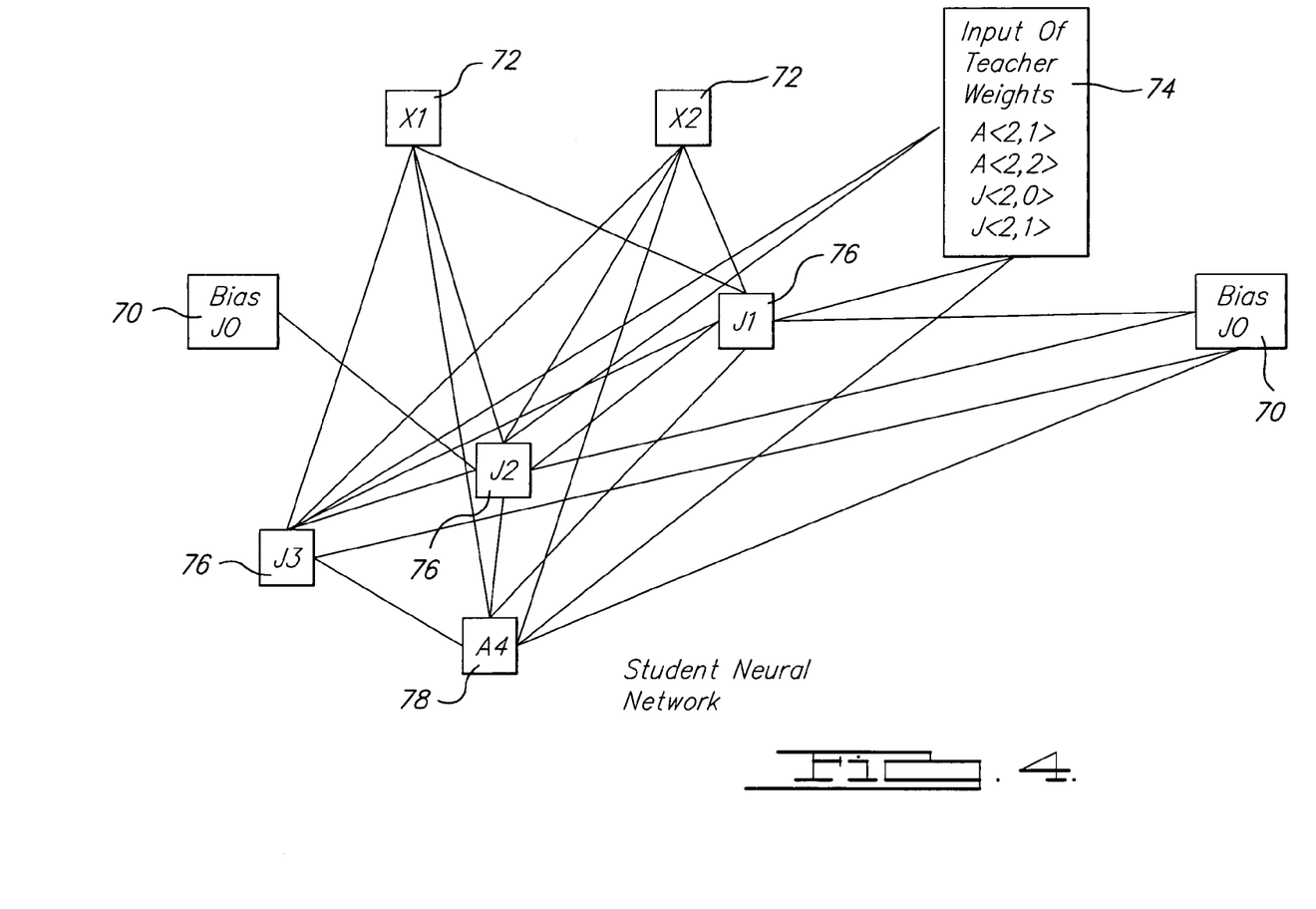
FIG. 4 is a diagram showing the configuration and interconnection of the nodes of the student network.

As seen in FIG. 4, the student neural network 14 consists of eight input nodes. The eight input nodes consist of two bias inputs 70, both labeled J0, two process inputs 72, labeled X1 and X2, and four weight inputs 74 for receiving the weight sets 66 from the sixteen different teachers 28 through 58. The student network 14 also has three hidden nodes 76, labeled J1, J2, and J3, and an output node 78, labeled A4. As with the teacher network 12, the strength of the connections between the nodes 70, 72, 74, 76, and 78 are determined by weights (not specifically shown). Also similar to teacher network 12, the value entered at bias inputs 70 is preferably 1 and the values entered at process inputs 72 are preferably the following: 0,0; 0,1; 1,0; and 1,1.

Figure 5A:
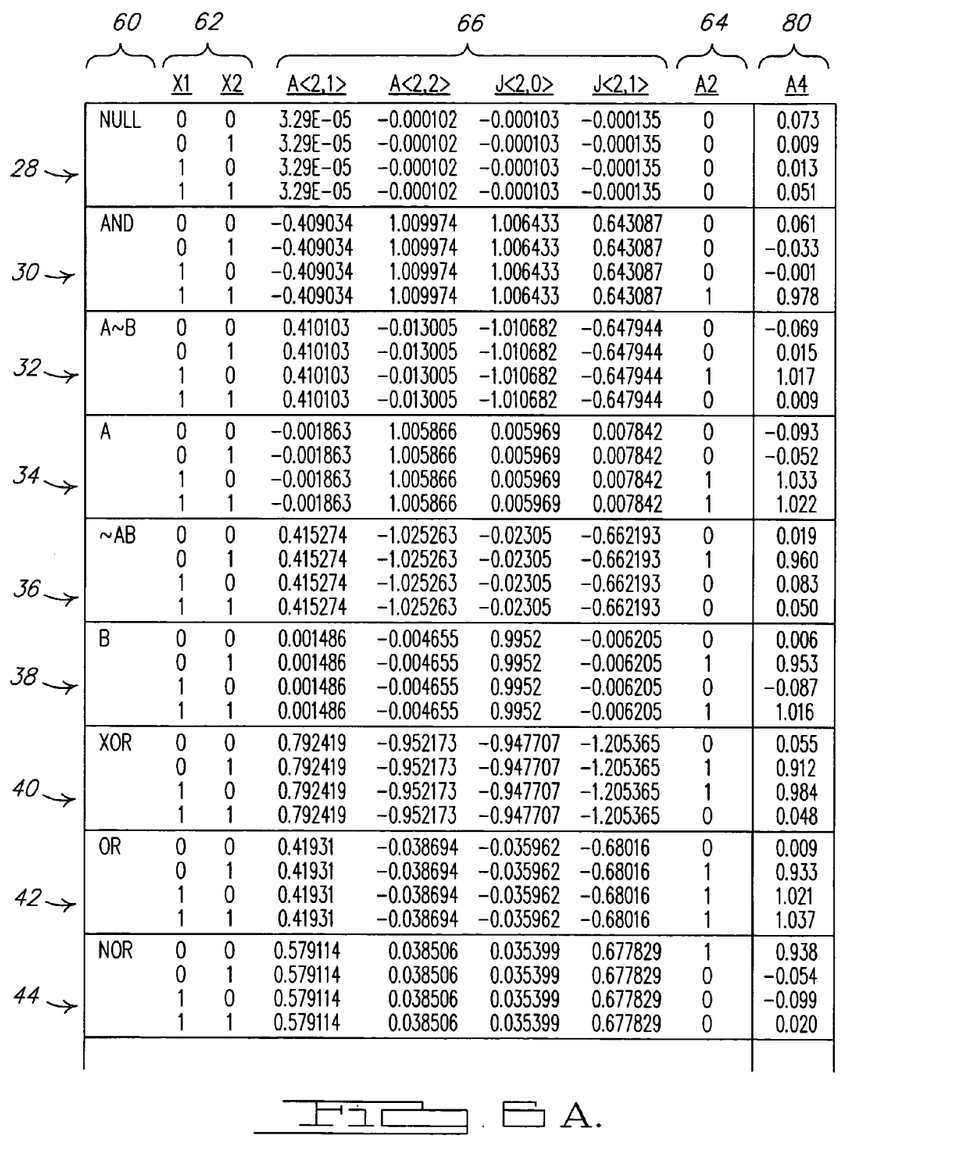
FIG. 5a is a table illustrating the tutoring inputs supplied by the different teacher networks for introduction into the student network.
Figure 5B:
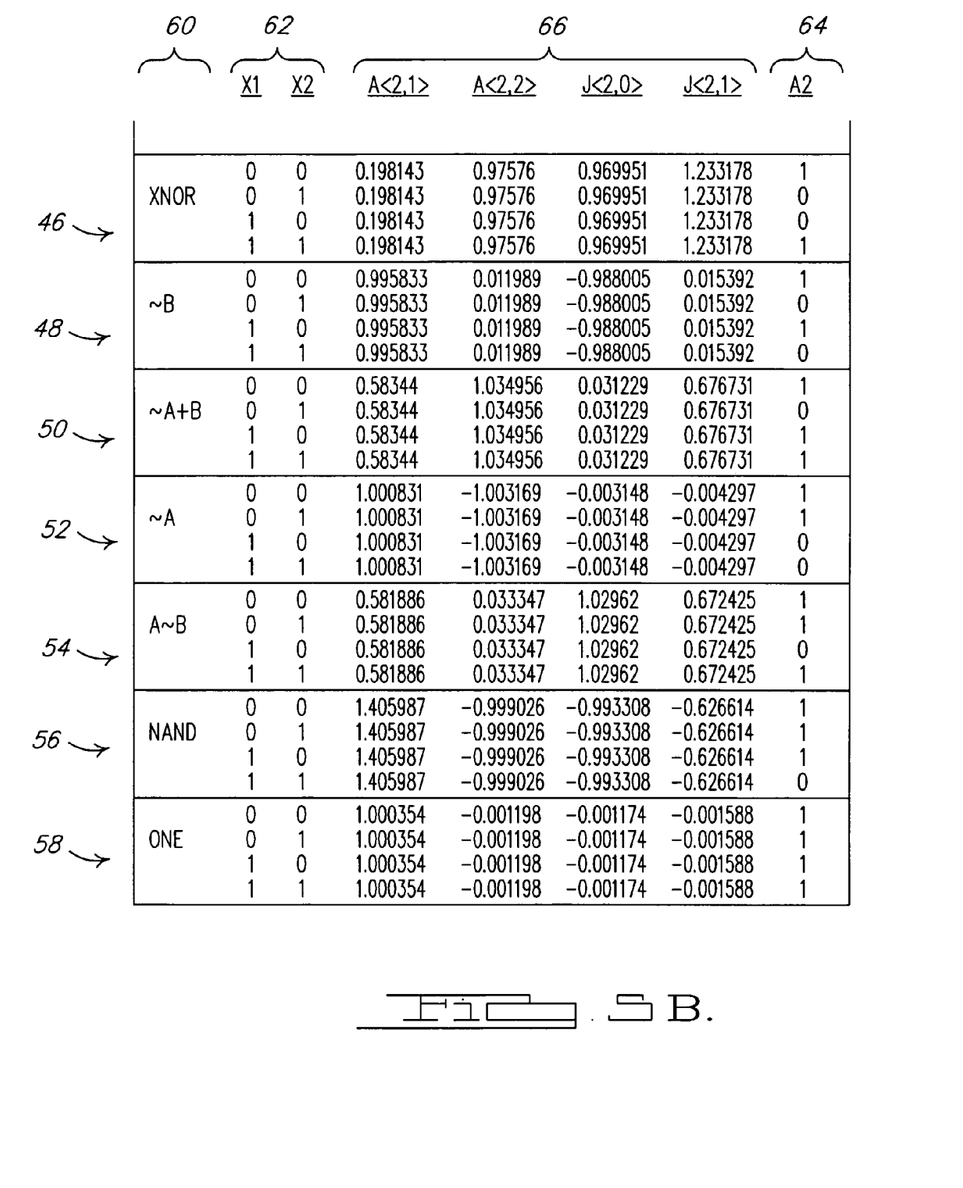

Examples of tutoring inputs used to train student network 14 are provided in FIGS. 5a and 5b. As discussed above, the tutoring inputs consist of the four possible combinations of teacher input data 62 for each teacher network 28 through 58 and the weight set 66 and teacher outputs 64 associated with each data input 62. However, it must be noted that the weight set 66, as illustrated in FIG. 5, does not include all of the weights 24 obtained through back propagation of each individual teacher 28 through 58. Specifically, weights 24 A<1,1>, A<1,2>, and J<1,0> are not included because they are the same throughout the different teacher networks 28 through 58, thus making the addition of these weights to the student 14 irrelevant as their inclusion will not change the output of the student 14. If the weights were not identical, they would be included as inputs to student 14.

Figure 6B:
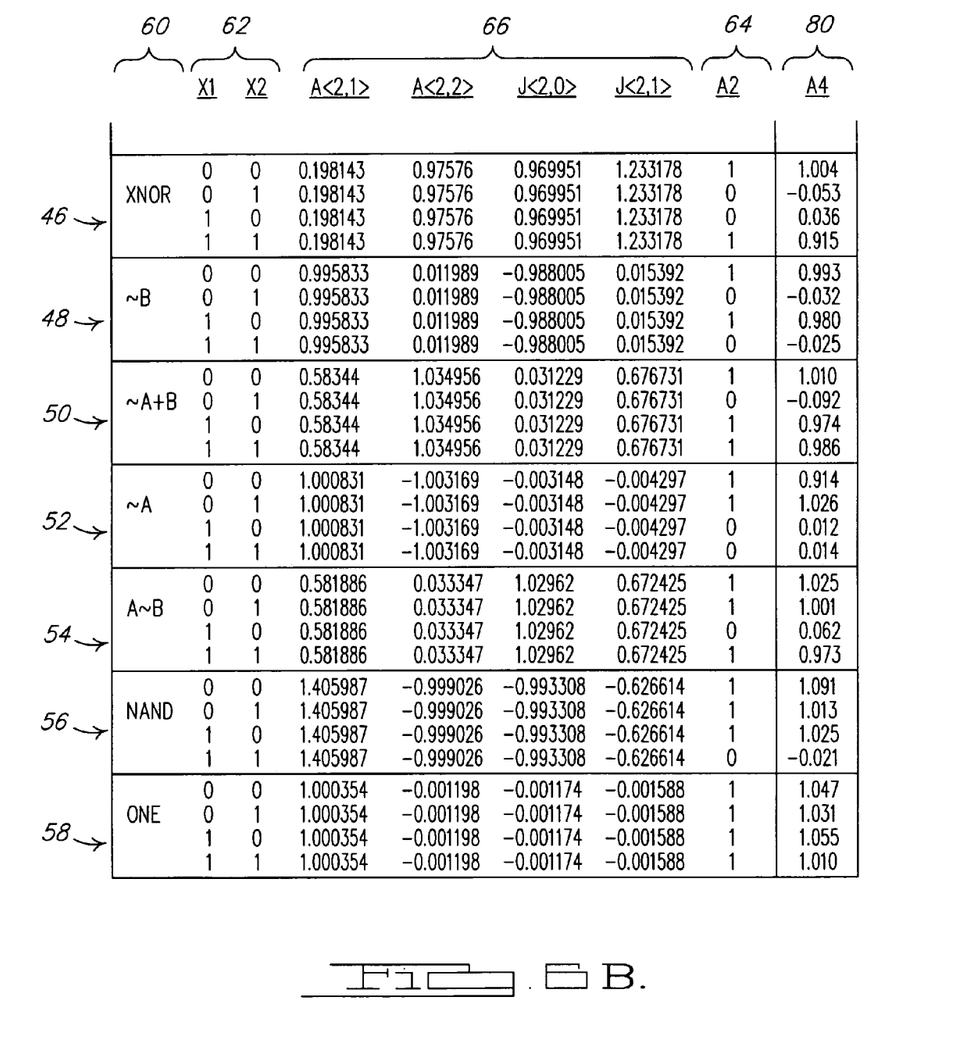

Once the student network 14 receives the tutoring inputs 62, 64, 66 from the teacher networks 28 through 58 as presented in FIG. 5, the tutoring inputs 62, 64, 66 are repeatedly run through the student 14 until the student is able to produce an output at 78 approximating teacher outputs 64 within the range of error selected by the user. For example, using the tutoring inputs 62, 64, 66 produced by networks 28 through 58 of FIG. 3, the student network 14 was instructed to solve the sixteen Boolean functions and obtain outputs similar to the outputs 64 of teacher networks 28 through 58 within an error value of, for example, 0.1. Through back propagation of errors the student network 14 produced the outputs 80 of FIGS. 6a and 6b. In order to produce the outputs 80 of FIG. 6 within a range of 0.1 of the teacher outputs 64, it was necessary to run the student network 532 times.

Figure 7:
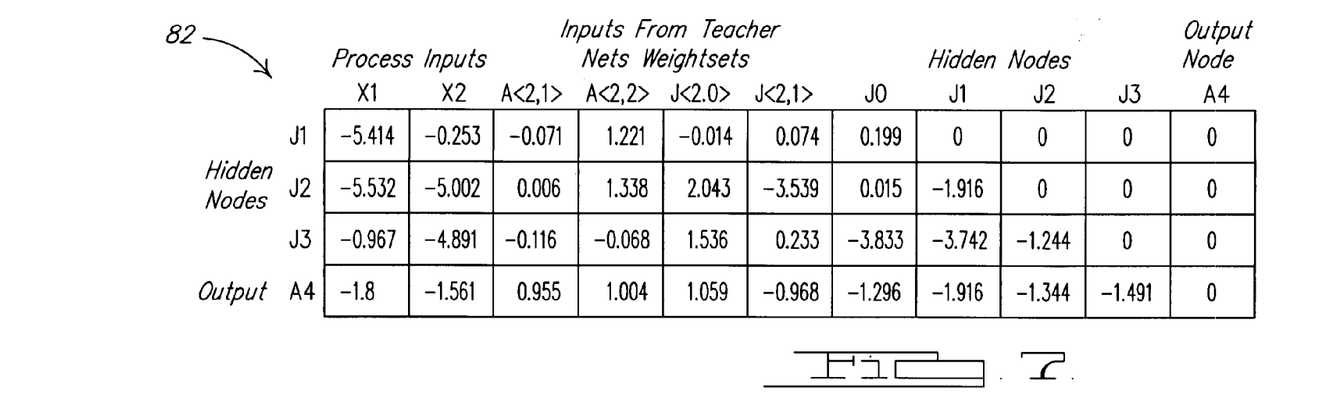
FIG. 7 is a table illustrating the weight set used by the student network to obtain the outputs of FIG. 6.

During the process of learning the tutoring inputs 62, 64, 66, the weights of the student network 14 are adjusted so as to produce the desired output 80. Once the desired output 80 has been achieved, the weights of the student 14 are fixed. With the weights of the student network 14 fixed in the position required to produce the desired output 80, the student 14 is now capable of solving all of the sixteen equations of the teacher networks 28 through 58 without requiring any adjustment of its weights. For example, using back propagation, it was determined that the use of weight set 82 (FIG. 7) allows the student network 14 to reach conclusions that most closely approximate the results 64 of the teachers 28 through 58. To determine the weight value between two given nodes, the horizontally listed nodes are cross referenced with the vertically listed nodes. It must be noted that the weights of FIG. 7 are shown merely for illustrative purposes as other weight values may also be used.

Calculation of an output 84 produced by student network 14 using student weight set 82 is similar to the calculation of the output 64 of teacher networks 28 through 58. Thus, the output value 84 at node 78 is determined by multiplying the input values at nodes 70, 72, and 74 by the weights connecting nodes 70, 72, and 74 to output node 78. Specifically, the output value 84 at output node 78 may be determined using the following equation:

$$A4 = X1*-1.800 + X2*-1.561 + A<2,1>*0.955 + A<2,2>*1.004 + <2,0>*1.059 + J<2,1>*-0.968 + J0*-1.296 + J1*-1.916 + J2*-1.344 + J3*-1.491.$$

To determine the values of the hidden nodes J1, J2, and J3 76 the following equations are used:

$$J1 = \text{TAN } H(0.5*(X1*-5.414 + X2*-0.253 + A<2,1>*-0.071 + A<2,2>*1.221 + J<2,0>*-0.014 + J<2,1>*0.074 + J0*0.199));$$

$$J2 = \text{TAN } H(0.5*(X1*-5.532 + X2*-5.002 + A<2,1>*0.006 + A<2,2>*1.338 + J<2,0>*2.043 + J<2,1>*-3.539 + J0*0.015)); \text{ and}$$

$$J3 = \text{TAN } H(0.5*(X1*-0.967 + X2*-4.891 + A<2,1>*-0.116 + A<2,2>*-0.068 + J<2,0>*1.536 + J<2,1>*0.233 + J0*-3.833)).$$

Figure 8A:
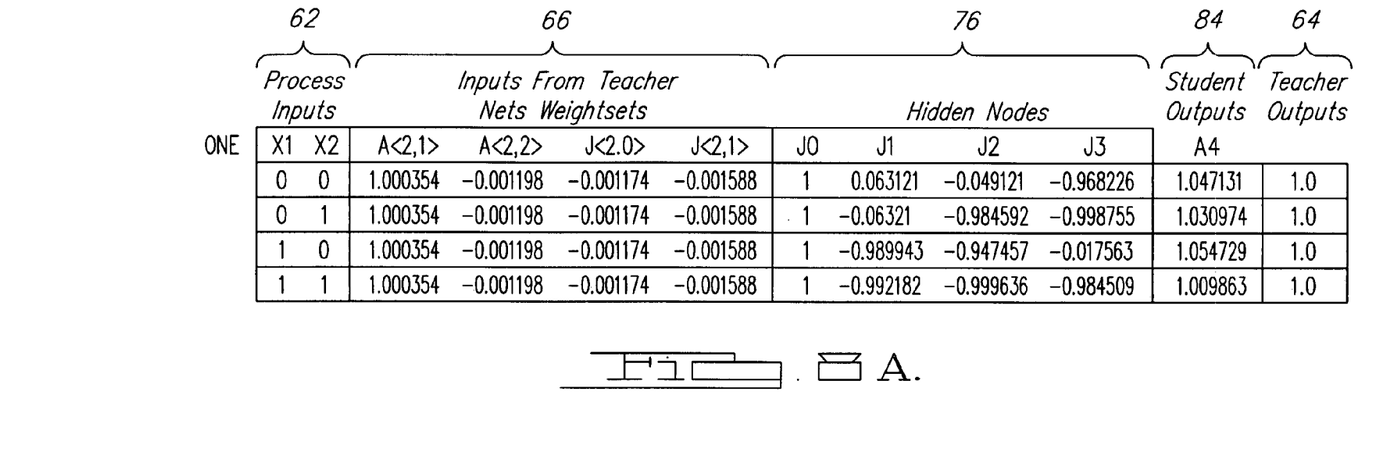
FIG. 8a provides a table illustrating inputs processed by the student using the weight set of FIG. 7 and the resulting outputs associated with each input.
Figure 8B:
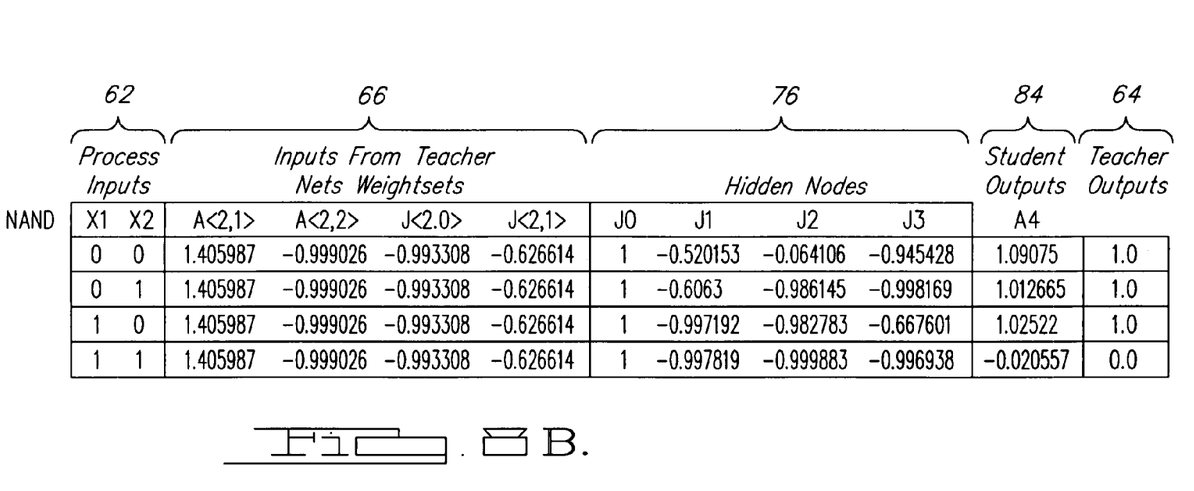
FIG. 8b provides a table illustrating additional inputs processed by the student using the weight set of FIG. 7 and the resulting outputs associated with each input.
Figure 8C:
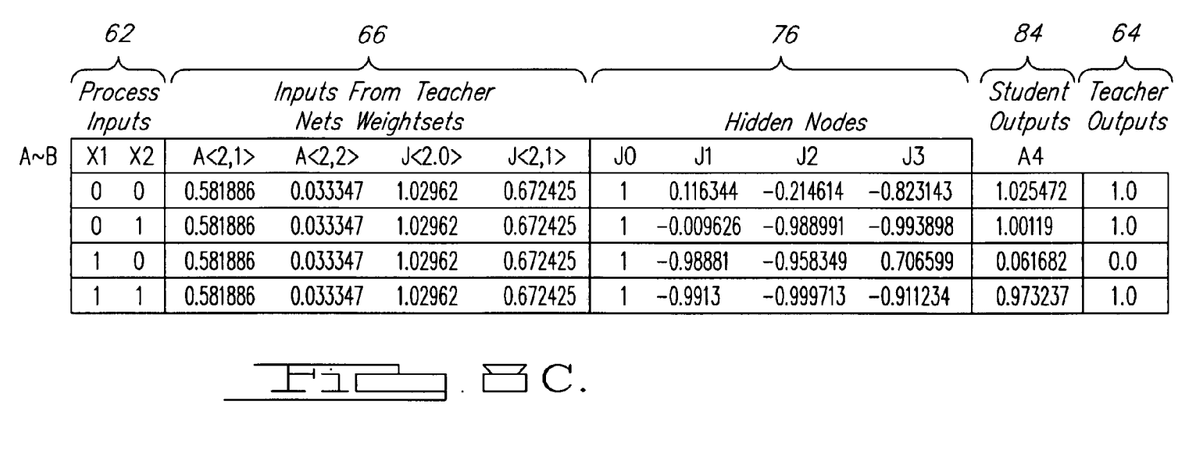
FIG. 8c provides a table illustrating further inputs processed by the student using the weight set of FIG. 7 and the resulting outputs associated with each input.

Introduction of teacher weights 66 to student network 14 at 74 is necessary so as to allow the student 14 to identify which particular Boolean function it is to solve. For example, to solve the Boolean function ONE using the student neural network 14 the set weights of teacher network 58 used to solve the function ONE are input to the student at 74. As seen in FIGS. 8a, 8b, and 8c, by using weights 66, for example, the student network 14 is able to calculate the value 84 of output node 78 according to the particular process input 62 entered by the user. In addition to listing the tutoring inputs 66 required by the student 14 to solve three Boolean functions, FIG. 8 also lists examples of possible process inputs 62 to the student 14, possible values of hidden nodes 76, and possible student network 14 output values 84 as compared to the possible output values 64 of teacher networks 28 through 58. As seen in FIG. 8, the student network 14 has been successfully trained to produce the results of the teacher networks 28 through 58 as the difference between student outputs 84 and the teacher outputs 64 are well within acceptable error ranges.

The values of both process inputs 62 and the teacher weight inputs 66 may be applied to the student network 14 externally. Specifically, the teacher weight inputs 66 may be applied to the same pins 68 to which the tutoring inputs 62, 64, 66 are applied. In addition to being directly applied to the student network 14 from teacher 12, the teacher weight inputs 66 may be transferred from the teacher network 12 to any other device capable of storing the teacher weights 66 and later delivering the teacher weights 66 to the student network 14. In contrast, the values of process inputs 62 are introduced to the student network 14 using any suitable conducting device such as pins 86.

While the above described student network 14 consists of input nodes 70, 72, 74, and three hidden nodes 76 connected to an output 78, Applicant's invention is not limited to such a configuration. Specifically, the student network 14 of Applicant's invention may consist of any suitable neural network having any number of input nodes, hidden nodes, and output nodes interconnected in any suitable configuration.

In addition to using student network 14 to solve numerous different Boolean functions, such as those presented by teacher networks 28 through 58, the student network 14 may be used to solve most any problem suitable to being solved by a neural network. For example, the student network 14 may be used to learn different aircraft flight control commands and operations as presented by any number of teacher networks.

In order to reprogram the student network 14 to solve a set of problems different from those solved by teacher networks 28 through 58, it is not necessary to change any of the internal weights of the network 14. In order to reprogram the network 14 it is only necessary to supply a new series of training inputs 62, 64, 66 at external input 68. Consequently, on-line learning and relearning is made possible without encountering the problems associated with obtaining access to a network's internal weights.

Thus, a student neural network 14 has been described. The student network 14 is capable of receiving a series of tutoring inputs 62, 64, 66, from one or more teacher networks 12. The tutoring inputs 62, 64, 66 are introduced externally to the student 14 by way of a suitable conducting device such as metal pins 68. The tutoring inputs 62, 64, and 66 are repeatedly processed by the student 14 until, using a suitable method such as back propagation of errors, the outputs 84 of the student 14 are within a predefined error range.

Once the desired outputs 84 are obtained, the weights of student 14 are set according to weight set 82, however, it must be realized that weight set 82 is shown simply for illustrative purposes as other weights could possibly be used. Using the weight set 82, the student 14 is now capable of solving all of the problems of the teacher networks 28 through 58 without the need for adjustment of its internal weights. Further, if the user desires to use the student 14 to solve a different series of problems, the user only needs to retrain the student 14 by supplying a different series of tutoring inputs 62, 64, 66. Thus, in order to re-train the student 14 direct access to the internal weights of student 14 is not necessary.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A neural network system comprising:
   a teacher neural network, said teacher neural network capable of receiving and processing a problem set so as to produce a series of tutoring inputs, said tutoring inputs including an output solution to said problem set; and
   a student neural network trained using said tutoring inputs to produce a student output that closely approximates said output solution, and is operable to be retrained by repeatedly processing a different set of tutoring inputs derived from a different teacher network.

2. The neural network system of claim 1, wherein said teacher neural network comprises at least one teacher input node and at least one teacher output node, said teacher input node and said teacher output node interconnected in accordance with teacher weights set to permit said teacher neural network to arrive at said output solution.

3. The neural network system of claim 2, further comprising at least one hidden node.

4. The neural network system of claim 2, wherein said tutoring inputs comprise said teacher network weight settings, said output solution, and said problem set input.

5. The neural network system of claim 4, wherein said student is trained by repeatedly processing said tutoring inputs until values of said student weights that produce said student output approximating said output solution are obtained, said student weights being fixed at said values.

6. The neural network system of claim 5, wherein said training is accomplished through back propagation of errors.

7. The neural network system of claim 5, wherein said student processes an input using said fixed student weights to produce said student output.

8. The neural network system of claim 1, wherein said tutoring inputs are introduced to said student neural network using a suitable conducting device external to said student network.

9. The neural network system of claim 1, wherein said teacher network is comprised of more than one teacher network.

10. The neural network system of claim 9, wherein said student network is trained using tutoring inputs from said more than one teacher network to produce a student output that closely approximates an output solution produced by any one of said more than one teacher network.

11. A method of using a student neural network to produce student outputs that closely approximate an output solution produced by a teacher neural network comprising:
   providing a teacher network with teacher weights set to produce an output solution in response to a specific problem set input;
   transferring said teacher weights, said problem set input, and said output solution to said student network having student weights;
   training said student network using said teacher weights, said problem set input, and said output solution so as to arrive at a setting for said student weights that causes said student network to produce a student output that closely approximates said output; and
   retraining said student network through the introduction of a second set of teacher weights, a second problem set input, and a second output solution all produced by a second teacher network.

12. The method of claim 11, wherein said teacher weights, said problem set input, and said output solution are transferred to said student network by way of a conducting device external to said student network.

13. The method of claim 11, wherein said training step is accomplished by back propagation of errors.

14. The method of claim 11, wherein said teacher network is comprised of more than one teacher network.

15. The method of claim 14, wherein said student network is trained using an output solution, a problem set input, and teacher weights from said more than one teacher network to produce a student output that closely approximates an output solution produced by any one of said more than one teacher network.

16. A neural network system comprising:
a first teacher neural network having first internal weights operable to solve a first problem set; and
a student neural network in receipt of said first internal weights, said student neural network operable to solve said first problem set using said first internal weights.

17. The neural network system of claim 16, further comprising a second teacher neural network having second internal weights operable to solve a second problem set, said student neural network in receipt of said second internal weights to permit said student neural network to solve said second problem set.

18. The neural network system of claim 16, wherein said student neural network is retrained by a second teacher neural network to solve a second problem set.

* * * * *